Dec. 6, 1938.  G. E. MILLER  2,139,198
TRACTOR UNIT CONTROL
Filed Jan. 13, 1938  2 Sheets-Sheet 1
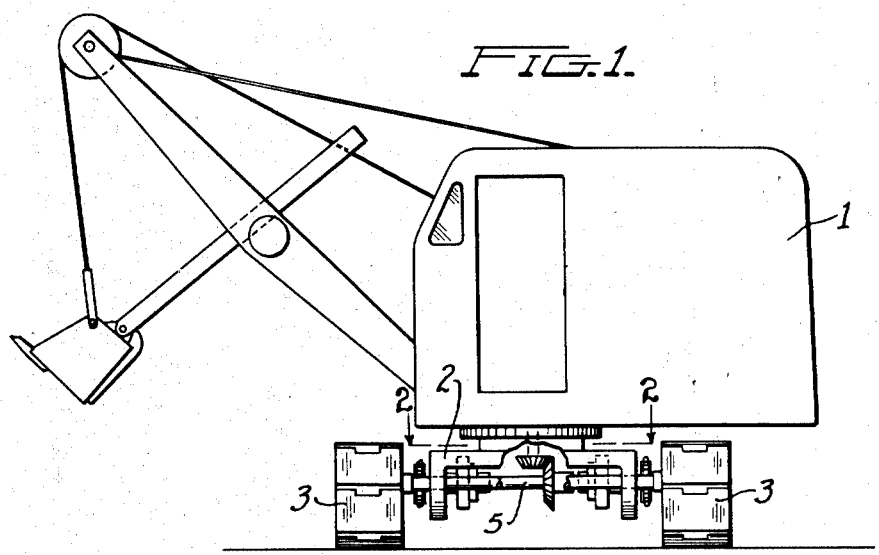
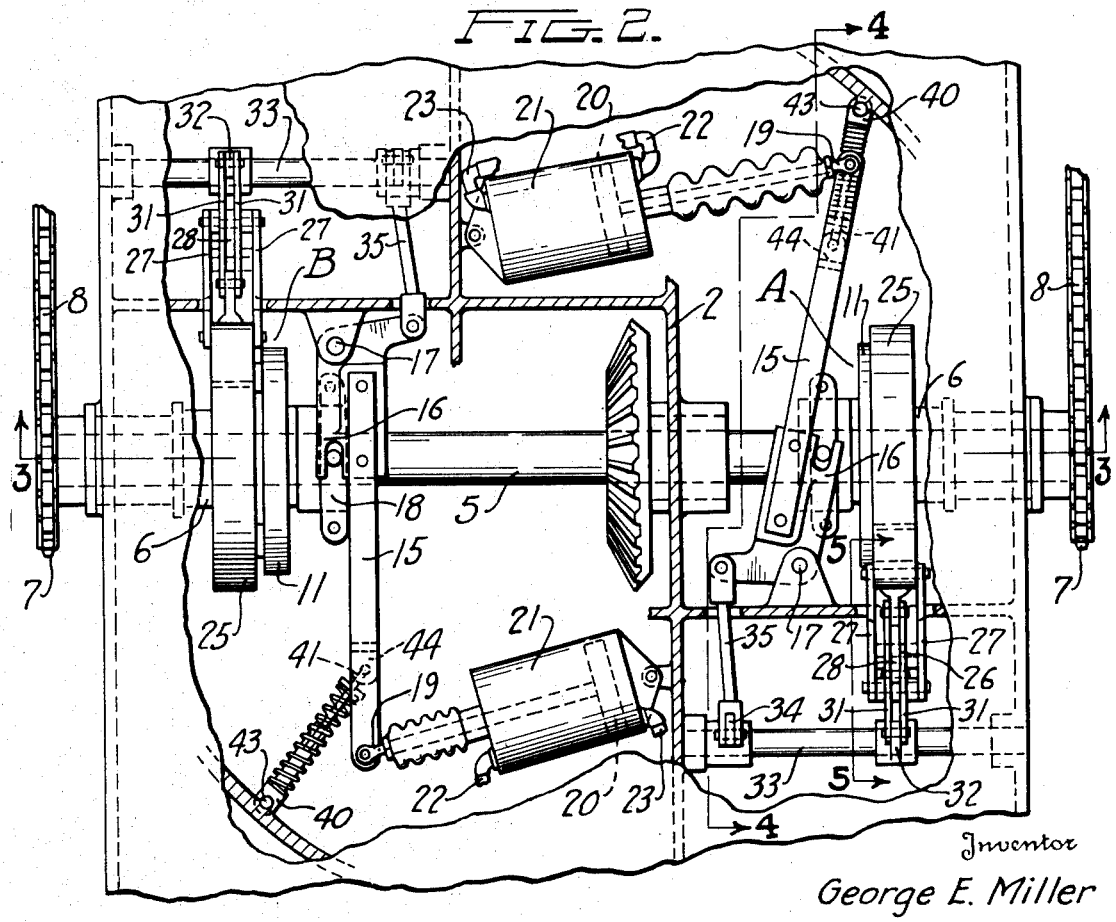
Inventor
George E. Miller
By Owen & Owen,
Attorneys.

Dec. 6, 1938.    G. E. MILLER    2,139,198
TRACTOR UNIT CONTROL
Filed Jan. 13, 1938    2 Sheets-Sheet 2
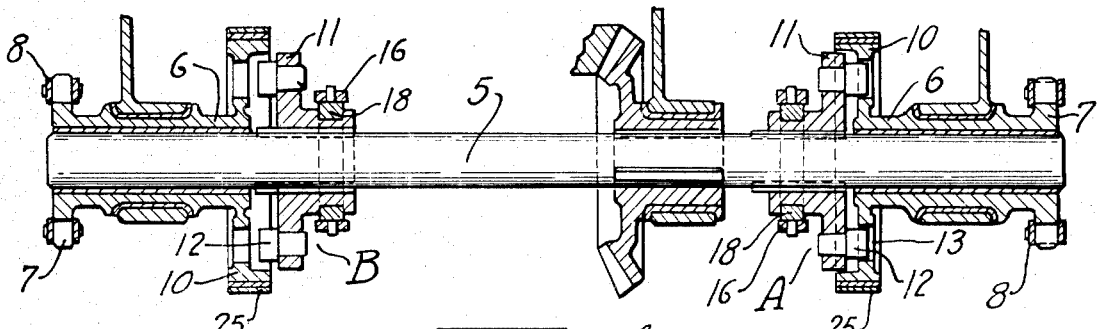
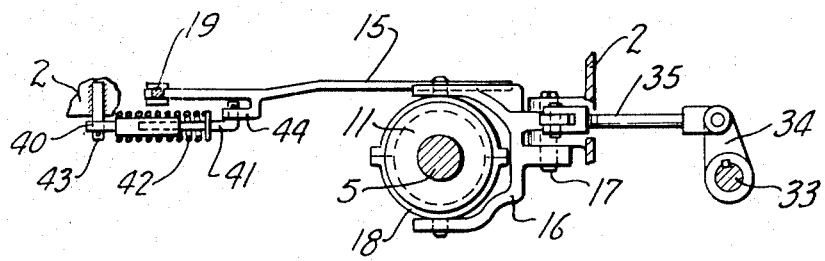
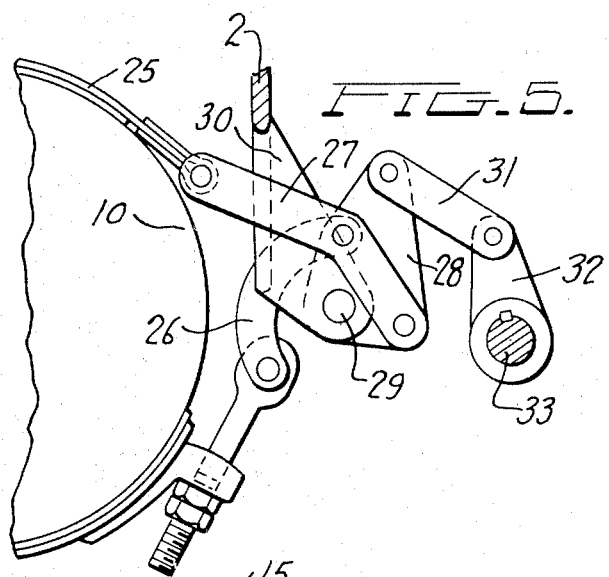
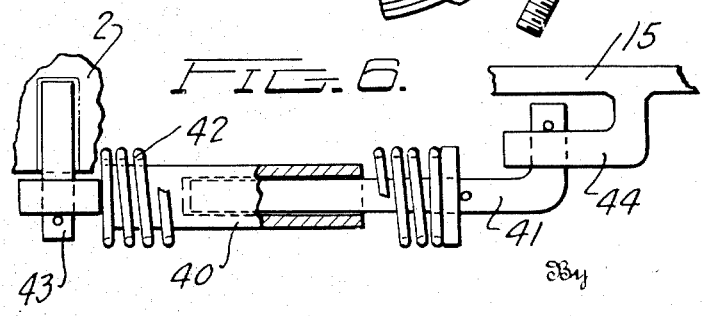
Inventor
George E. Miller
By Owen & Owen
Attorneys.

Patented Dec. 6, 1938

2,139,198

UNITED STATES PATENT OFFICE 2,139,198

TRACTOR UNIT CONTROL

George E. Miller, Findlay, Ohio, assignor to The Buckeye Traction Ditcher Company, Findlay, Ohio, a corporation of Ohio Application January 13, 1938, Serial No. 184,840

6 Claims. (Cl. 192—17)

This invention relates to traction apparatus of the type employing laterally opposed traction units, which are relatively operable to effect a steering of the apparatus, and has reference particularly to the control means for such traction units.

In apparatus of this class, a common drive means is usually employed for the two laterally opposed traction units, and each unit has a brake and clutch controlled connection with the drive means, which brake and clutch are alternately operable. These elements for each tractor unit are alternately applied and released, and are customarily selectively controlled by pneumatic action. A uniform driving in the same direction of both tractor units is effected when both clutches are engaged and a turning is effected by a driving of either one or the other of the units, depending on the desired direction of turn, as well understood in the art. Both brakes may also be applied when the apparatus is at rest, and this is particularly desirable when the apparatus is left on an incline. Such pneumatically operated braking action is satisfactory when the apparatus is not left standing for any considerable period. It is found, however, that when the apparatus is left standing for a considerable period, for instance over night, a leak in the pneumatic control line may permit or effect a release of the brakes which, as will be appreciated, is dangerous to life and property should the apparatus be on an incline down which it may roll when the brakes are released.

The object of the present invention is the provision, in an apparatus of this class, of simple and efficient means which is automatically operable, independently of the pneumatic control means, to maintain the brakes in engagement should the usual brake holding means fail from any cause.

The invention is fully described in the following specification, and is illustrated in the accompanying drawings, in which—

Figure 1 is an elevation of a swinging crane type excavating machine having the invention associated therewith; Fig. 2 is an enlarged fragmentary section on the line 2—2 in Fig. 1, with parts broken away, and with one tractor unit driving clutch engaged and its associated brake released, and with the other tractor unit driving clutch released and its associated brake engaged for turning purposes; Fig. 3 is a section on the line 3—3 in Fig. 2; Fig. 4 is a fragmentary section on the line 4—4 in Fig. 2; Fig. 5 is an enlarged fragmentary section on the line 5—5 in Fig. 2, and Fig. 6 is an enlarged detail of a portion of the automatic control means shown in Fig. 4

The invention is illustrated, in the present instance, in association with a swinging crane type excavator (Fig. 1), the cab 1 of which is swingingly mounted on a truck frame 2 which is supported by laterally opposed tractor units 3, 3, usually of the endless tread chain type. A power shaft 5, which is driven in any suitable manner from a power source in the cab 1, as well understood in the art, carries at each end a loose sleeve 6 in suitable driving connection with the respective tractor unit 3. Such connection, in the present instance, includes a sprocket wheel 7 on the sleeve and a chain 8.

One sleeve 6, the right in the present instance, has releasable engagement with the shaft 5 through a clutch A while the other sleeve 6 has similar engagement through a clutch B. Each of these clutches includes a driven member 10 on the sleeve at its inner end and a drive member 11 feathered to the shaft 5 for shifting movements axially thereof. The clutches, in the present instance, are of the pin type, the member 11 carrying pins or studs 12 engageable in openings 13 in the other member.

The shifting of the clutch member 11 is effected by movements of the shipper lever 15 which crosses the shaft 5 transversely thereof and has a fork portion 16 fulcrumed to the frame 2, as at 17, and has its fork straddling a loose ring 18 on the hub portion of the clutch member 11 and pivotally engaging pins projecting from opposite sides thereof, as best shown in Fig. 4. The opposite end of the lever 15 is connected by a rod 19 to a plunger 20 operating in an associated cylinder 21. Each end of the cylinder 21 is in connection through a respective line 22, 23, with a selective manual control in the cab 1 common to apparatus of this type, whereby the plunger 20 may be operated by differential fluid pressure to move in either direction, depending on the movement which it may be desired to impart to the associated lever 15. The operating means usually employed is of a pneumatic nature.

The control for each tractor unit 3 also includes a brake which is shown, in the presence instance, as comprising a brake band 25 mounted around the periphery of the associated clutch member 10. The opposite ends of the brake band 25 are connected by respective links 26 and 27 to a rocker member 28 pivotally mounted at 29 on a bracket 30 projecting from an adjacent part of the frame 2. The connections of the brake band with the member 28 are such as to cause a tightening of the brake band on the member 10 when the member 28 is rocked in one direction, and vice versa. The rocker member 28 is connected by a link 31 to a rocker arm 32 on an associated rock shaft 33 disposed parallel to the shaft 5 and journaled in adjacent portions of the frame 2. This rock shaft has a second arm 34 projecting therefrom and connected by a link 35 to the inner end portion of the associated shipper lever 15 in spaced relation to the fulcrum 17 of such lever transversely of the longitudinal axis of the lever. The connection between the lever 15 and brake band is such that when the lever is shifted to effect an engagement of the associated clutch, the brake on the clutch member 10 and associated sleeve 6 is released, and vice versa.

The control mechanism for the tractor units above described is common to excavating machines and other apparatus employing separately operable tractor units, and nothing is claimed therefor per se. It is found in the operation of such apparatus that while it is possible to apply the brakes of both tractor units at the same time, thus holding the apparatus in set position whether on an incline or otherwise, such holding means cannot be depended on if left for any length of time without an attendant, as a leak in the fluid pressure control means may permit a release of the brakes, and if the apparatus is standing on an incline, would permit it to run down such incline and cause possible injury to the machine or other property, and also to individuals happening to be near.

The present invention resides in providing means in connection with each control lever 15 for automatically maintaining the brakes in applied position and at the same time not interfering with the operation of brakes and clutches effected by the operator through the customary differential fluid pressure control.

The automatic means embodying the present invention consists in applying a spring thrust connection between each control lever 15 and the frame 2, whereby a spring pressure is exerted on the lever to maintain it in brake applying position, as shown at the left of Fig. 2. Such means includes two telescoped members 40 and 41 having a coiled expansion spring 42 in end thrust engagement with opposed shouldered portions thereof, one of said members being pivotally anchored to the frame 2, as to a stud 43 projecting therefrom, and the other being pivotally connected to a finger 44 on the lever 15, with the axes of both of said pivotal connections parallel to the axis of the lever fulcrum 17 (Figs. 2, 4 and 6). The pivotal connection 43 is preferably located in substantially the line of the longitudinal axis of the lever 15 when the lever is thrown to clutch-engaged position and such axial line is preferably disposed in laterally offset relation to the fulcrum 17 toward the point of connection of the link 35 with the inner lever end, so that the spring thrust of the connection 40, 41, 42 is slightly off dead center with respect to the fulcrum 17 even when the lever 15 is in clutch engaged position, thus normally tending to urge the lever to brake engaged position. It is apparent that when the lever is in brake applying position, as shown at the left of Fig. 2, the angular position of the automatic brake applying connection 40, 41, 42 is such that said connection applies a sufficient pressure on the control lever to maintain the brakes in engaged position.

It is thus evident that the automatic brake means embodying the present invention not only serves to maintain the associated brake in applied position, but also tends to assist the differential fluid pressure means in its clutch releasing and brake applying operation.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a power driven apparatus, a frame, a tractor unit, means for driving said unit including a clutch, a brake, and a shipper member connected to said clutch and brake and operable to move the member to alternately engage them, differential fluid pressure means connected to said shipper member and selectively operable to move it to apply either the clutch or the brake, and means connecting said frame and shipper member and automatically operable to yieldingly maintain the shipper member in brake applying position should the fluid pressure fail, said connecting means including telescoped members and a coiled spring therebetween.

2. In a power driven apparatus, a frame, a tractor unit, means for driving said unit including a clutch, a brake and a shipper member connected to said clutch and brake and operable to move the member to alternately engage them, differential fluid pressure means connected to said shipper member and selectively operable to move it to apply either the clutch or the brake, and means connecting said frame and shipper member and automatically operable to yieldingly maintain the shipper member in brake applying position should the fluid pressure means fail, said connecting means including a link composed of slidingly telescoped elements and pivoted at one end to the frame and at its other end to the shipper member, and a coiled expansion spring between the link elements to exert an expanding action thereon, the position of the link being such that it is angularly disposed with respect to the shipper member when such member is in brake applying position.

3. In a power driven apparatus, a tractor unit, means for driving said unit including a clutch, a brake, a shipper member connected to and operable to effect alternate engaging and releasing movements to said clutch and brake, differential fluid pressure means connected to said shipper member and selectively operable to move it to apply either the clutch or brake, and spring means connected to said shipper member and automatically operable to yieldingly maintain it in brake applying position should the fluid pressure means fail, said spring means including a multiple link which stands in dead center relation to the shipper member when in clutch applying position and has spring action to urge an application of the brake only when the shipper member is out of clutch applying position.

4. In a power driven apparatus, a frame, a tractor unit, means for driving said unit including a clutch, a brake and a shipper member connected to said clutch and brake and operable to move the member to alternately engage them, differential fluid pressure means connected to said shipper member and selectively operable to move it to apply either the clutch or the brake, and means connecting said frame and shipper member and automatically operable to yieldingly maintain the shipper member in brake applying position should the fluid pressure means fail, said connecting means including a link composed of members adapted to have relative movements to lengthen or shorten the distance between the points of connection of the connecting means with the frame and shipper member and also including a spring normally urging a relative lengthening movement of such connection to urge a movement of the shipper member to apply the brake.

5. In a power driven apparatus, a frame, a tractor unit, means for driving said unit including a clutch, a brake and a shipper member connected to said clutch and brake and operable to move the member to alternately engage them, differential fluid pressure means connected to said shipper member and selectively operable to move it to apply either the clutch or the brake, and means connecting said member and frame and operable to urge a movement of the member to apply the brake when the member is out of its limit of clutch engaging movement, said connecting means being inactive to impart any movement to the shipper member when it is in clutch engaging position.

6. In a power driven apparatus, a frame, a tractor unit, means for driving said unit including a clutch, a brake and a shipper lever and operable to move the lever to alternately engage them, said lever fulcrumed at one side of and extending crosswise of the clutch axis, differential fluid pressure means connected to said lever and selectively operable to move it to apply either the clutch or the brake, and a link connection between said lever and frame pivotally connected to each and adapted to stand in dead center position with respect to the lever when the lever is in clutch engaging position and including a spring for urging a brake applying movement of the lever when the connection is out of dead center position.

GEORGE E. MILLER.